United States Patent
Szor et al.

(10) Patent No.: US 7,360,249 B1
(45) Date of Patent: Apr. 15, 2008

(54) REFINING BEHAVIORAL DETECTIONS FOR EARLY BLOCKING OF MALICIOUS CODE

(75) Inventors: Peter Szor, Northridge, CA (US); William E. Sobel, Stevenson Ranch, CA (US)

(73) Assignee: Symantec Corporation, Cupertino, CA (US)

( * ) Notice: Subject to any disclaimer, the term of this patent is extended or adjusted under 35 U.S.C. 154(b) by 845 days.

(21) Appl. No.: 10/757,742

(22) Filed: Jan. 13, 2004

(51) Int. Cl.
*H04L 9/00* (2006.01)

(52) U.S. Cl. .......................... 726/22; 726/23; 726/24; 726/25; 713/164; 713/188; 713/190; 709/216; 709/217

(58) Field of Classification Search ............... None
See application file for complete search history.

(56) References Cited

U.S. PATENT DOCUMENTS 6,981,279 B1 * 12/2005 Arnold et al. ............... 726/22

OTHER PUBLICATIONS

Ryutov, T., et al, 'Integrated access control and intrusion detection for web servers', IEEE Transactions on Parallel and Distributed Systems, vol. 14,No. 9, Sep. 2003, entire document http://ieeexplore.ieee.org/iel5/71/27643/01233707.pdf?arnumber=1233707.*

* cited by examiner

*Primary Examiner*—Nasser Moazzami
*Assistant Examiner*—Ronald Baum
(74) *Attorney, Agent, or Firm*—Fenwick & West LLP

(57) ABSTRACT

A blocking-scanning manager (101) detects (200) attempted malicious behavior of running code (120). In response to detection, the blocking-scanning manager (101) blocks (206) the attempted malicious behavior. The blocking-scanning manager (101) generates (208) a signature to identify the code that attempted the malicious behavior. The blocking-scanning manager (101) detects (506) code identified by the signature. Responsive to detection, the blocking-scanning manager (101) blocks (508) execution of the identified code (122).

22 Claims, 6 Drawing Sheets

REFINING BEHAVIORAL DETECTIONS FOR EARLY BLOCKING OF MALICIOUS CODE

TECHNICAL FIELD

This invention pertains generally to computer security, and in particular, to detecting and blocking malicious code propagation on computer systems.

BACKGROUND ART

Computer systems face a threat of attack by malicious computer code, such as worms, viruses and Trojan horses. As used herein, "malicious computer code" is any code that enters a computer without an authorized user's knowledge and/or without an authorized user's consent.

Malicious code can infect a computer in a number of manners. For example, a user might insert an infected disk or other medium into a computer so that the computer becomes infected when the disk files are accessed. Computers connected to networks are also vulnerable to attack. In a network-based attack, malicious code can be transmitted to the computer as an executable program, for example in an email attachment. In this example, the malicious code might attack the computer when the user clicks on the e-mail attachment, or the e-mail attachment might open automatically when the user reads, or in certain cases previews, the e-mail. In addition, malicious code can even be embedded within the text of the e-mail itself.

Antivirus scanning software can be installed on computers in an attempt to prevent malicious code attacks. Antivirus scanning software scans computer files, including e-mail attachments and e-mails, to detect the presence of malicious code by looking for known malicious code signatures. Thus, antivirus scanning software can only detect the presence of malicious code for which a known signature is available. The antivirus scanning software will generally fail to detect new malicious code until an updated signature for the malicious code is available. Even if this window of time is small, malicious code can still do an enormous amount of damage to computer systems. In addition, antivirus software can detect malicious code using heuristics scanning. While heuristics scanning does not use traditional signatures for detection, even heuristics can miss new malicious code variants.

Behavior blocking software provides another antivirus technique for preventing or minimizing damage caused by malicious code attacks. Behavior blocking software is programmed through a number of policies to permit benign actions on a computer, but to intercede and prevent unauthorized activities that might be malicious. While behavior blocking software also uses signatures for detection of malicious behavior, these signatures are behavioral-based, allowing entire classes of malicious code to be prevented in many variations. For example, a signature for a particular malicious behavior can be used to identify numerous types or variants of malicious code that all engage in this behavior. Behavior blocking software does require updates for new behavior pattern signatures. However, updates are required much less frequently in behavior blocking software compared to the updating requirements of antivirus scanning signatures. Thus, behavior blocking software is less likely than antivirus scanning software to fail to detect malicious code due to lack of sufficiently current information about the code.

Behavior blocking software can potentially stop attacks by new malicious code that would be missed by antivirus scanning software because the code does not yet have a known antivirus scanning signature. However, because behavior blocking software only detects a threat once the malicious code is being executed on a system, the malicious code often has a chance to do damage before detection.

An individual threat can strike a computer system a number of times. For example, an infected e-mail attachment containing the same malicious code can be sent to a user multiple times. The e-mail attachment might appear to be different each time, or appear to originate from a known sender. Allowing a user to execute an infected e-mail attachment numerous times and waiting for the behavior blocking software to detect the behavior each time can pose problems. Additionally, each time the malicious code is executed, the computer system is at risk of an attack that the behavior blocking software might not timely recognize. For example, the malicious code might execute an action that the behavior blocking software will not detect, such as a Trojan action, before replicating itself or executing some other detectable action. As another example, the malicious code can be programmed to execute a damaging action only under certain conditions, such as on a particular day of the week. The behavior blocking software might detect and block the malicious code without damage the first two times it is executed, for example. However, the third execution could occur on a day that triggers the code to strike and cause damage before the software detects the code.

Antivirus scanning software might fail to detect the new malicious code each time it is executed because there is no known signature for the code. However, behavior blocking software only detects new malicious code as it is running on the system, at which point it has possibly already done some damage. Accordingly, there is a need to recognize and remember new malicious code the first time it is executed, so that subsequent execution of the code can be prevented.

DISCLOSURE OF INVENTION

The present invention comprises methods, systems, and computer readable media for preventing the propagation of malicious code on a computer system. A blocking-scanning manager (101) detects (200) attempted malicious behavior of running code (120). In response to detection, the blocking-scanning manager (101) blocks (206) the attempted malicious behavior. The blocking-scanning manager (101) generates (208) a signature to identify the code that attempted the malicious behavior. The blocking-scanning manager (101) detects (506) code identified by the signature, and blocks (508) execution of the identified code (122).

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein might be employed without departing from the principles of the invention described herein.

DETAILED DESCRIPTION OF THE PREFERRED EMBODIMENTS

Figure 1:
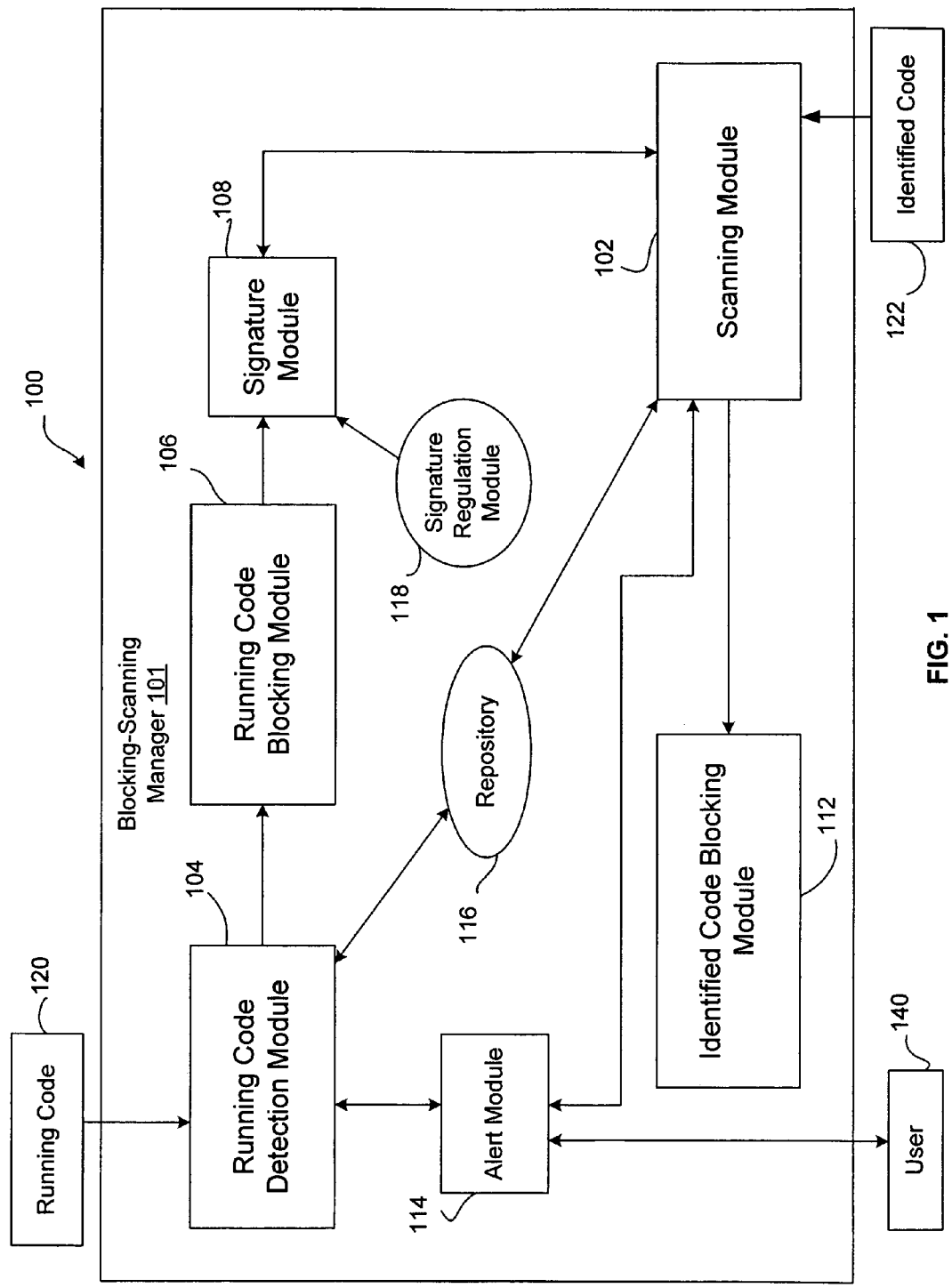
FIG. 1 is a block diagram illustrating a high level overview of a system for practicing some embodiments of the present invention.

FIG. 1 illustrates a high level overview of a system 100 for performing some embodiments of the present invention. Illustrated is a blocking-scanning manager 101 that can detect and block attempted malicious behavior of running code 120, as well as generate identifying signatures and block execution of identified code 122. A running code detection module 104 of the blocking-scanning manager 101 is communicatively coupled to a running code blocking module 106, an alert module 114, and a repository 116. The running code blocking module 106 is also communicatively coupled to a signature module 108, which is in turn communicatively coupled to a signature regulation module 118 and a scanning module 102. The scanning module 102 is further communicatively coupled to an identified code blocking module 112. These components and functionalities are discussed in more detail below.

Although the blocking-scanning manager 101 is illustrated as a single entity, as the term is used herein a blocking-scanning manager 101 refers to a collection of functionalities that can be implemented as software, hardware, firmware or any combination of the three. Where a blocking-scanning manager 101 is implemented as software, it can be implemented as a standalone program, but can also be implemented in other ways, for example as part of a larger program, as a plurality of separate programs, or as one or more statically or dynamically linked libraries. In some embodiments, at least some of the blocking-scanning manager 101 functionalities are implemented as part of an antivirus behavior blocking system. In other embodiments, at least some of the blocking-scanning manager 101 functionalities are implemented as part of an antivirus scanning system or other type of antivirus system. In still other embodiments, the blocking-scanning manager 101 can comprise a system that is implemented as an antivirus scanning and behavior blocking system, in combination. The blocking-scanning manager 101 functionalities can also be distributed in various manners between or among more than one of the above and/or other antivirus components.

Although the modules and other entities associated with the blocking-scanning manager 101 are illustrated as single entities herein, each of these modules simply refers to a collection of functionalities that can be implemented as software, hardware, firmware or any combination of the three. Where implemented as software, these modules can be implemented as a standalone programs, but can also be implemented in other ways, as described above in reference to the blocking-scanning manager. The functionalities attributed to any one module can be divided up between multiple modules in various ways. Additionally, the functionalities attributed to more than one module can be incorporated into a single module. Of course, not all embodiments of the present invention have all of the illustrated modules.

As shown in FIG. 1, the blocking-scanning manager 101 detects attempted malicious behavior of the running code 120. The code that attempts these malicious actions can have originated from a number of possible sources. For example, the code can come in over a network connection or in a computer readable medium, such as a disk. The code can be embedded in an executable file, text file, binary file, or any other type of file. For example, the code could be embedded in an e-mail attachment, an image, a word processing document, a spreadsheet, a compressed file, an encrypted file, etc. The running code detection module 104 can detect attempted malicious behavior of running code 120 in various ways. For example, the running code detection module 104 could be set to allow benign actions to occur, and to intercede only when certain unauthorized actions occur, such as unauthorized code replication. In some embodiments, the user has control over which types of actions will trigger the running code detection module 104. Which specific actions trigger the running code detection module 104 is a design choice. Examples of blocking systems are described in the U.S. patent application Ser. No. 10/322,289, having the same assignee, the entirety of which is hereby incorporated by reference.

In one embodiment, an alert module 114 alerts a user 140 when the running code detection module 104 detects attempted malicious behavior. Additionally, the alert module 114 can be configured to allow the user 140 to choose how to proceed, and whether or not to block the behavior of the running code 120.

In another embodiment, the alert module 114 is configured to override the user's 140 choice in some instances. For example, the alert module 114 can override a user's choice responsive to the user 140 incorrectly choosing to block non-malicious behavior or incorrectly choosing not to block malicious behavior. In this manner, the system 100 prevents a situation where the user 140 has accidentally chosen to permanently block a non-malicious program that should have been permitted to run. Also, this provides a safeguard against the user's 140 misjudgment in allowing malicious code to be executed. The alert module 114 can be triggered to override a user's 140 choice in a number of ways. For example, the alert module 114 might override a user's 140 choice if after further analysis of the potentially malicious code is conducted, it is determined that the code is likely to be malicious.

In still another embodiment, the alert module 114 is not included in the system 100 and the user 140 is not alerted of the detection. Instead, after detection by the running code detection module 104, the running code blocking module 106 blocks the running code 120 without consulting the user 140.

In one embodiment, the running code detection module 104 is communicatively coupled to a repository 116. When the running code detection module 104 detects potentially malicious behavior of running code 120, the code 120 can be placed in the repository 116. Once in the repository 116, the code is prevented from causing harm, and the user 140 might be able to access information about the code but can no longer execute the code.

In response to detection of attempted malicious behavior, the running code blocking module 106 of the blocking-scanning manager 101 blocks the behavior. The running code blocking module 106 can block the malicious behavior in a number of ways. For example, the running code blocking module 106 might remove the code from the computer system, might disable the code in some manner, might isolate the code by placing it in a repository where it is prevented from causing harm, etc.

In one embodiment, the running code blocking module 106 blocks malicious behavior in response to notification by either the running code detection module 104 or directly from the alert module 114 that the user 140 has chosen to block the behavior. In another embodiment, the running code blocking module 106 can block the behavior without alerting the user 140 or receiving input from the user 140. For example, further analysis of the running code 120 might determine its potential maliciousness, and the running code blocking module 106 can block the behavior of the code 120 on the results of the analysis, rather than on a user's 140 choice.

The signature module 108 of the blocking-scanning manager 101 generates a signature to identify the running code 120. The signature can be taken of a specific portion of the running code 120. For example, the signature can be taken of a particular portion in which malicious code is often found, such as a portion or all of a code segment, a data segment, a file header, or any combination of these. The signature can also be taken of the entire running code 120. The signature generated can be stored in a file where it can be later accessed for identification of potential malicious code. The signature can be stored locally on the computer, on a remote server, or elsewhere. In other embodiments, the signatures are generated by the scanning module 102 or by a module separate from the blocking-scanning manager 101. The generation of signatures is discussed in more detail below.

In one embodiment, the signature module 108 is also communicatively coupled to a signature regulation module 118, which sets a limit on the number of signatures that can be generated in a given time period. The signature regulation module 118 determines when a predetermined limit has been reached, and the signature regulation module 118 limits the number of signatures generated.

The signature limit can be set in various ways. For example, there can be a limit set on how many signatures can be generated each day, or within another specified time period, such as an hour or a week. There might also be a numerical limit on the number of signatures that can be generated, in total. The limit might be set by the user 140, or it might be preset automatically in the blocking-scanning program.

The management of signatures can occur in a number of manners. For example, when the signature limit is reached, the system 100 can begin deleting one or more of the older signatures as newer signatures are generated. As another example, the signatures generated can be sorted according to the number of matches per signature to running code 120 that attempted malicious behavior. In this example, the signatures with the fewest matches can be deleted when the limit is reached, as newer signatures are generated.

Communicatively coupled to the signature module 108 is the scanning module 102. Identified code 122 can have the same general malicious characteristics as running code 120, as described above. In addition, running code 120 and identified code 122 can be the same entity, or can be slightly modified polymorphic entities that are similar. For example, the user 140 might execute an e-mail attachment containing malicious code. When the user opens the attachment, the code 120 runs and is detected and blocked by the blocking-scanning manager 101, and a signature can be generated. The e-mail attachment might then appear a second time, or any number of times, in the user's 140 e-mail box and the user 140 might attempt to execute it any number of times. In these subsequent executions or attempted executions, however, the identified code 122 can be recognized by the blocking-scanning manager 101, which compares the identified code 122 to the signature that was previously generated to identify the code. The identified code 122 can be blocked before it is even executed this time.

The scanning module 102 can scan an e-mail attachment, file, program, etc. to determine if malicious code is present. For example, the scanning module 102 can use signatures of known malicious code, which might be stored in a database locally or on a remote computer, to determine if known malicious code is present. The scanning module 102 can also use the signatures generated by the blocking-scanning manager 101 to determine if new malicious code, which has so far only been identified by the blocking-scanning manager 101, is present. In this manner, the blocking-scanning manager 101 can connect the antivirus-scanning event to the behavior-blocking event so that a signature of new malicious code can be generated in response to a blocking event and used to identify the same or similar malicious code in the future.

The scanning module 102 can scan code before it is run, and compare to known signatures and to signatures generated by the blocking-scanning manager 101. If the code does not match with a known or generated signature, the scanning module 102 can permit the code to be executed. For example, if the code is new malicious code for which a signature is not yet available, the scanning module 102 will likely not find a match, and will allow execution of the code. Thus, the user must then rely on the blocking-scanning manager 101 to detect and block attempted malicious behavior of the running code 120 as early as possible, and hopefully before damage is done to the computer. With regard to identified code 122 for which a signature has been generated by the blocking-scanning manager 101, the scanning module 102 will access the stored signatures and detect a match. Thus, the code can be blocked before the code is even executed and has the opportunity to damage the computer.

The scanning module 102 can be communicatively coupled to the repository 116, and identified code can be stored in the repository 116.

The scanning module 102 can also be communicatively coupled to an alert module 114 that alerts the user 140 of the detected identified code 122. The alert module can also permit the user to choose whether or not to allow execution, and possibly override the user's incorrect choice, as described above.

Communicatively coupled to the scanning module 102 is an identified code blocking module 112. The identified code blocking module 112 then prevents the identified code 122 from running, as an antivirus program would prevent execution of a detected virus. In addition, the identified code blocking module 112 can take further antivirus-type actions, such as cleaning the infected file and otherwise ridding the computer of malicious code. The identified code blocking module 112 can also block execution of identified code 122 in the same manners that the running code blocking module 106 blocks the running code 120, as described above. In some embodiments, the identified code blocking module 112 and the running code blocking module 106 are implemented as a single module.

The scanning module 102 and the identified code blocking module 112 can be embodied in various ways. In one embodiment, the scanning module 102 scans the identified code 122 and finds a match with a generated signature. The scanning module 102 then flags the identified code 122 to the identified code blocking module 112, which blocks execution of the identified code 122. The identified code blocking module 112 can also be communicatively coupled to the signature module 108 so that the identified code blocking module 110 can access the stored signatures for potential further analysis of the identified code 122.

In another embodiment, responsive to finding a match with a generated signature, the scanning module 102 itself prevents the execution of the code. For example, the scanning module 102 might prevent the execution of code in the same manner that an antivirus scanner might prevent the execution of malicious code identified by a known signature. In this example, the identified code 122 can be prevented from executing and can be removed, disabled, quarantined, etc. by the scanning module 102. Thus, this example illustrates a scanning module 102 that both finds a match with a generated signature and blocks execution of the code, without involvement of an identified code blocking module 112.

Figure 2:
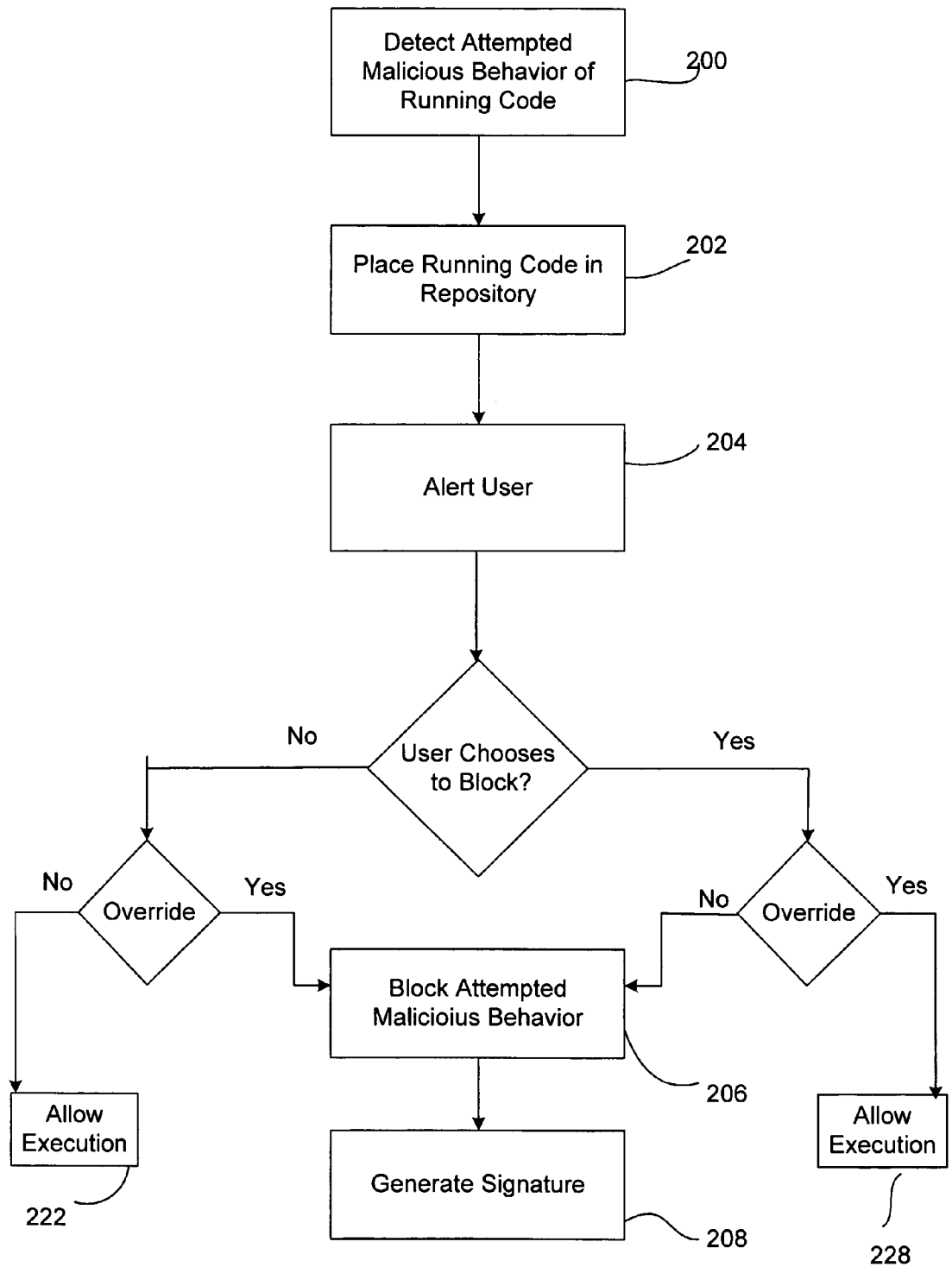
FIG. 2 is a flowchart illustrating steps for detecting and blocking attempted malicious behavior of running code, according to some embodiments of the present invention.

FIG. 2 illustrates steps for performing some embodiments of the present invention. The running code detection module 104 of the blocking-scanning manager 101 detects 200 attempted malicious behavior of running code 120. Upon detection, the running code detection module 104 places 202 the running code 120 for storage in a repository 116, where the running code 120 cannot cause damage to the computer. Also in response to detection, the alert module 114 alerts 204 the user 140 and the user 140 chooses which course of action to take. The user can choose to block the running code 120. If so, the running code blocking module 106 will then block 206 the attempted malicious behavior of the running code 120 in response to the user's choice. Alternatively, the user 140 can choose not to block the running code 120. In response, the system 100 will typically allow 222 execution of the running code 120. In some embodiments, the system 100 is configured to override an incorrect choice by the user 140. In these embodiments, if the user incorrectly chooses to block non-malicious running code 120, the system 100 will override the choice and allow 228 execution. If the user incorrectly chooses not to block malicious running code 120, the system 100 will override the choice and block 206 execution.

In some embodiments, the system 100 is not configured to override the user's choice. In this case, the system 100 will allow 222 execution if the user chooses not to block the running code 120 or block 206 execution if the user chooses to block, even if the choice is incorrect. In some embodiments, the system 100 is not be configured to give the user 140 a choice at all. In these embodiments, the user 140 might or might not be alerted 204, but then the running code blocking module 106 blocks 206 the attempted malicious behavior without the user's intervention.

Once the running code blocking module 106 blocks 206 the running code 120, the signature module 108 generates 208 a signature of a portion of or all of the running code 120. This signature can then be used in subsequent detection activity as explained above.

Figure 3:
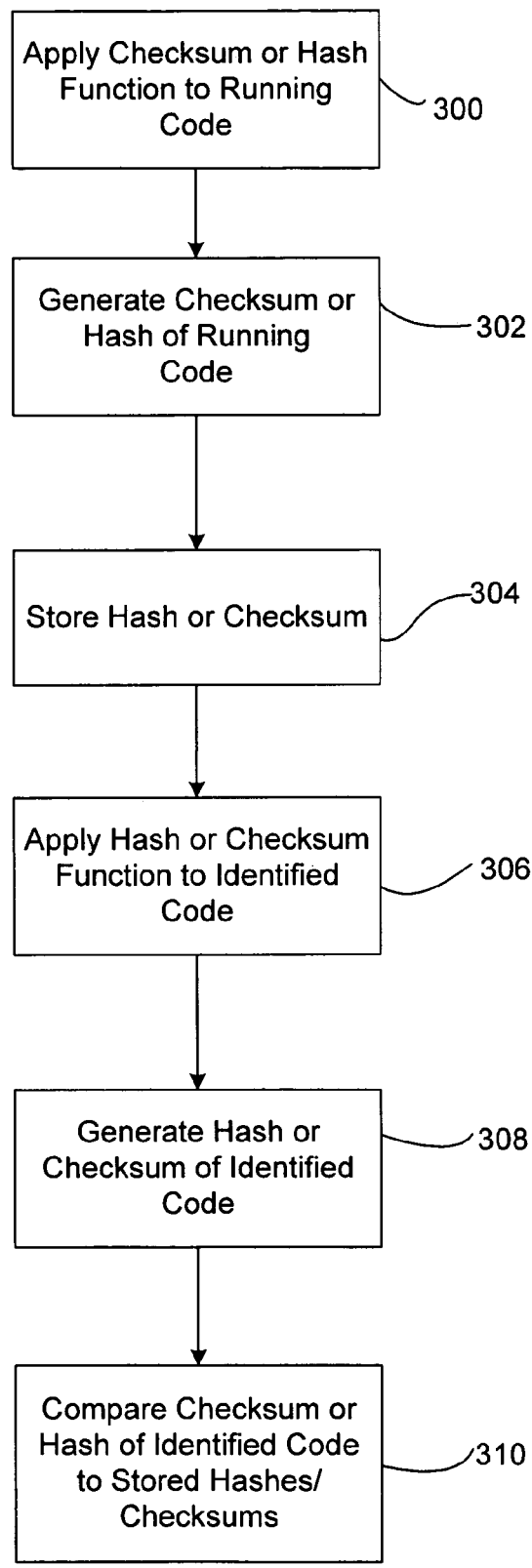
FIG. 3 is a flowchart illustrating steps for generating a code signature, according to some embodiments of the present invention.

Referring now to FIG. 3, there are shown steps of generating a signature of running code 120, according to some embodiments of the present invention. The signature module 108 applies 300 a checksum function or a hash function to the running code 120, and thereby generates 302 a checksum or hash of the running code 120. In one embodiment, the signature module 108 can apply 300 a checksum function to generate 302 an MD5 checksum of the running code 120 that can be used for later identification of the code. In another embodiment, the signature module 108 can apply 300 a hash function to certain segments or to all of the running code 120. In this embodiment, the signature module 108 can generate 302 a hash of either a data segment or of a code segment of the running code 120. Alternatively, the signature module 108 can generate 302 a hash of a header for the running code 120. In yet another embodiment, the signature module 108 can generate 302 a hash of any combination of any or all of a code segment, a data segment, a header, or any other segment of the running code 120.

The signature module 108 then stores 304 the checksum or hash of the running code 120. The checksum or hash can be stored 304 in the signature module, in another location on the computer, or even on a remote computer. The scanning module 102 applies 306 this checksum or hash to identified code 122 and generates 308 a checksum or hash of identified code 122. The scanning module 102 then compares 310 the checksum or hash of identified code 122 to stored checksums and hashes. In one embodiment, the hash function can be used to identify code 122 that has the same signature as the running code 120 from which the stored hash was generated. In another embodiment, the hash function can be used to identify code 122 that has a signature that is at least somewhat different from the signature of the running code 120 from which the stored hash was generated. For example, the hash function might be used to identify slight variations of the same malicious code that changes only a certain area of itself, such as its data section.

Figure 4:
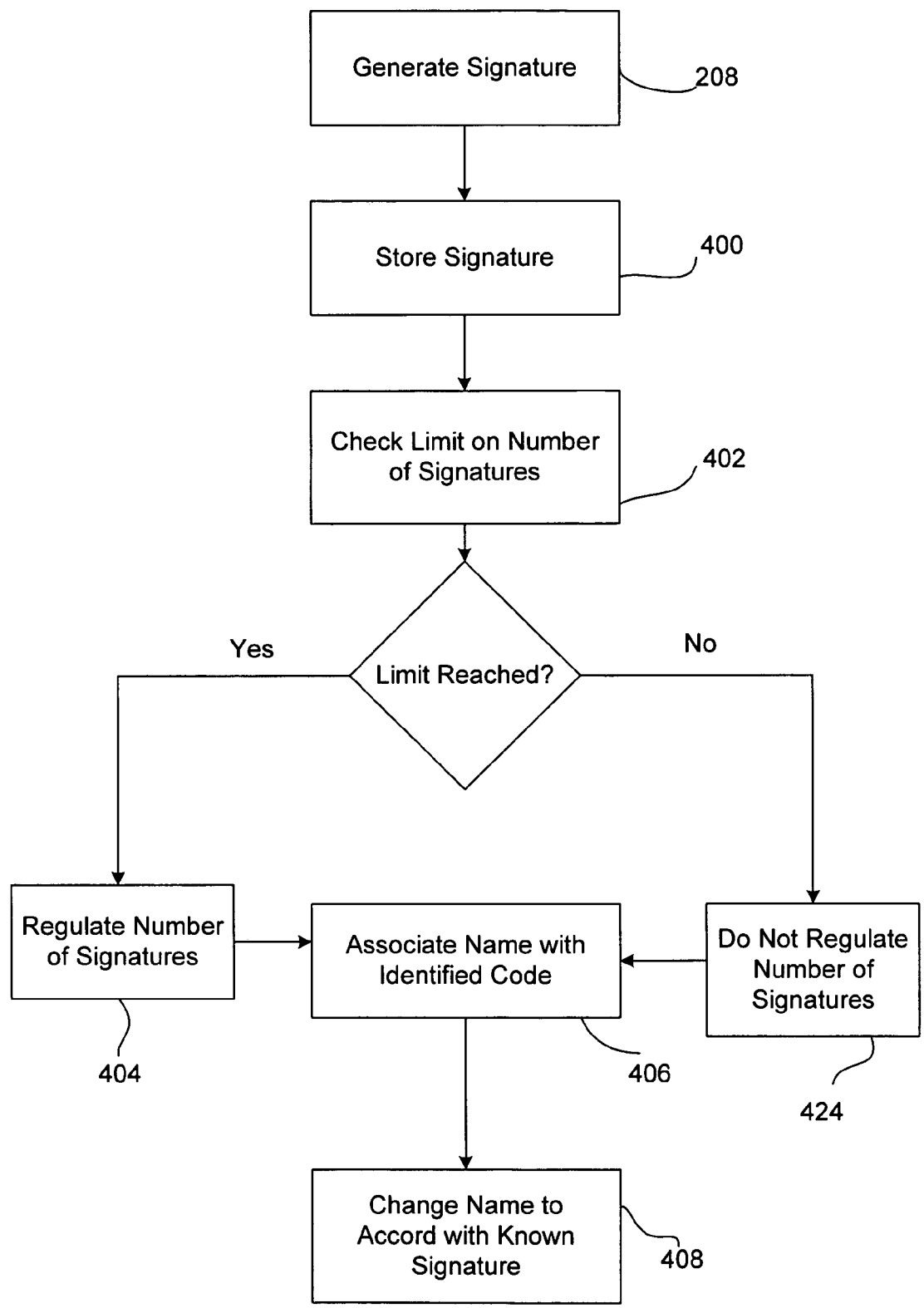
FIG. 4 is a flowchart illustrating steps for regulating and naming signatures, according to some embodiments of the present invention.

FIG. 4 illustrates steps for generating and using a signature of running code 120, according to some embodiments of the present invention. As explained above, the signature module 108 generates a signature 208 of the running code 120. The signature module 108 then stores 400 the signature generated. The signatures can be stored within the signature module 108, elsewhere on the computer, or even in a remote location.

The system 100 can also be configured to include a signature regulation module 118 that checks 402 the limit on the number of signatures, as explained in the discussion for FIG. 1. The signature regulation module 108 determines if the limit on the number of signatures has been reached. If the limit has been reached, the signature regulation module 108 regulates 404 the number of signatures in one of the manners explained in the discussion of FIG. 1. If the limit has not been reached, the signature regulation module 108 will not regulate 424 the signature number.

The signature module 108 can also associate 406 a name with the identified code 122 that the user 140 can use to recognize the code. The name can be stored locally or remotely. The name can be used to designate the identified code 122 such that it can be recognized if it strikes the user's system again. Thus, even though the identified code 122 might be new malicious code that does not yet have a known name or definition, code can be identified by using the name associated with it by the blocking-scanning manager 101.

Once a publicly known name for the malicious code becomes available, the signature module 108 can change 408 the local name to accord with the known name. In one embodiment, the signature module can access a database of stored signatures and names for known malicious code to change the local name. This database might be located on an antivirus server or another remote location. In another embodiment, the local name is automatically updated by a remote database when the malicious code becomes known.

Figure 5:
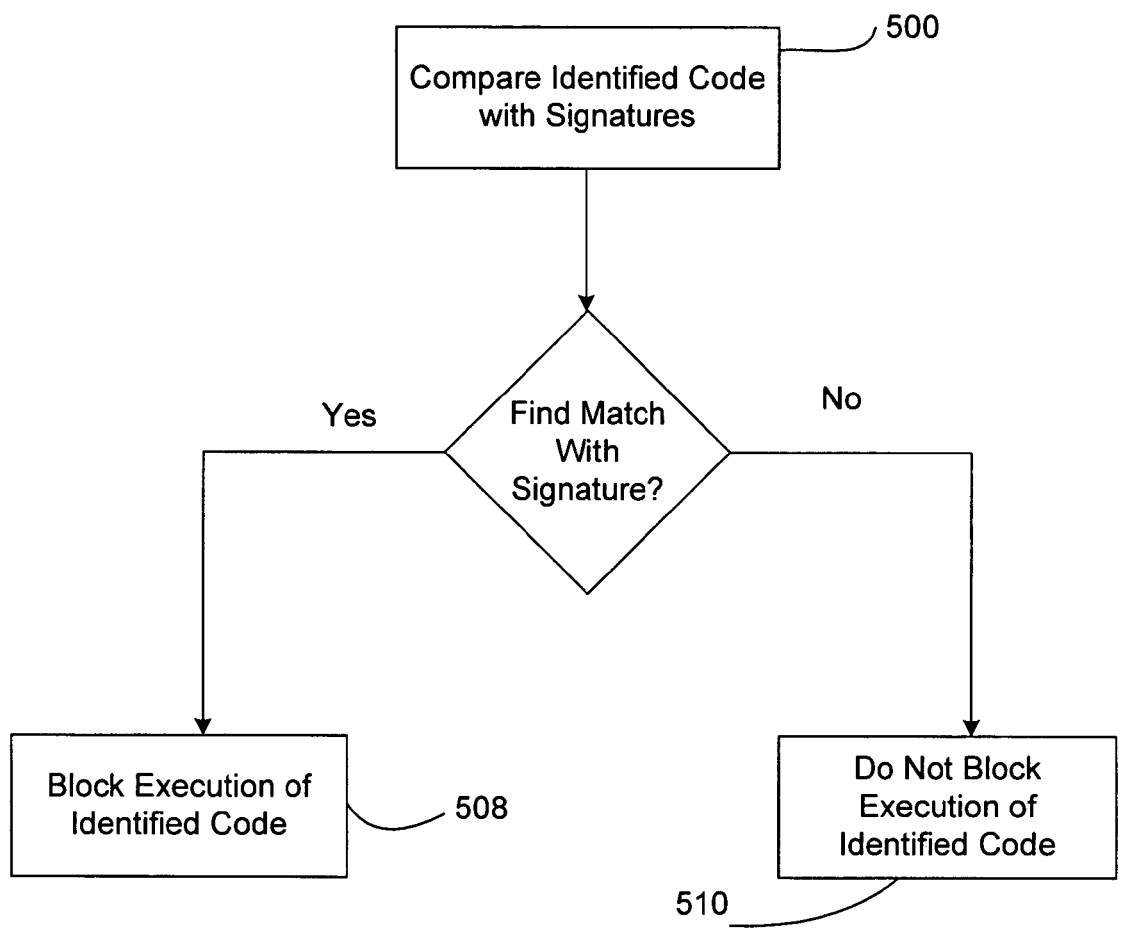
FIG. 5 is a flowchart illustrating steps for recognizing and blocking execution of identified code, according to some embodiments of the present invention.

FIG. 5 illustrates steps for blocking identified code 122, according to some embodiments of the present invention. The scanning module 102 scans and compares 500 identified code 122 with stored signatures that were created by the signature module 108. The scanning module 102 then attempts to find a match between the identified code and one of the stored signatures. If the scanning module 102 finds a match, the execution of the identified code 122 will be blocked 508. If the code scanned by the scanning module 102 has not previously attempted malicious behavior and thus a signature was not previously created for the code, then the scanning module 102 will find no match with the stored signatures and the execution of the identified code 122 will not be blocked 510.

In some embodiments, in addition to comparing 500 the identified code 122 to stored signatures, the scanning module 102 compares 500 the identified code 122 to known malicious code signatures, possibly stored in a database on a remote server or elsewhere. If the scanning module 102 finds no match with either the locally stored signatures or the known signatures, the execution of the identified code 122 will not be blocked 510. Responsive to finding a match with a signature and detecting the code, the identified code blocking module blocks 508 execution.

Figure 6:
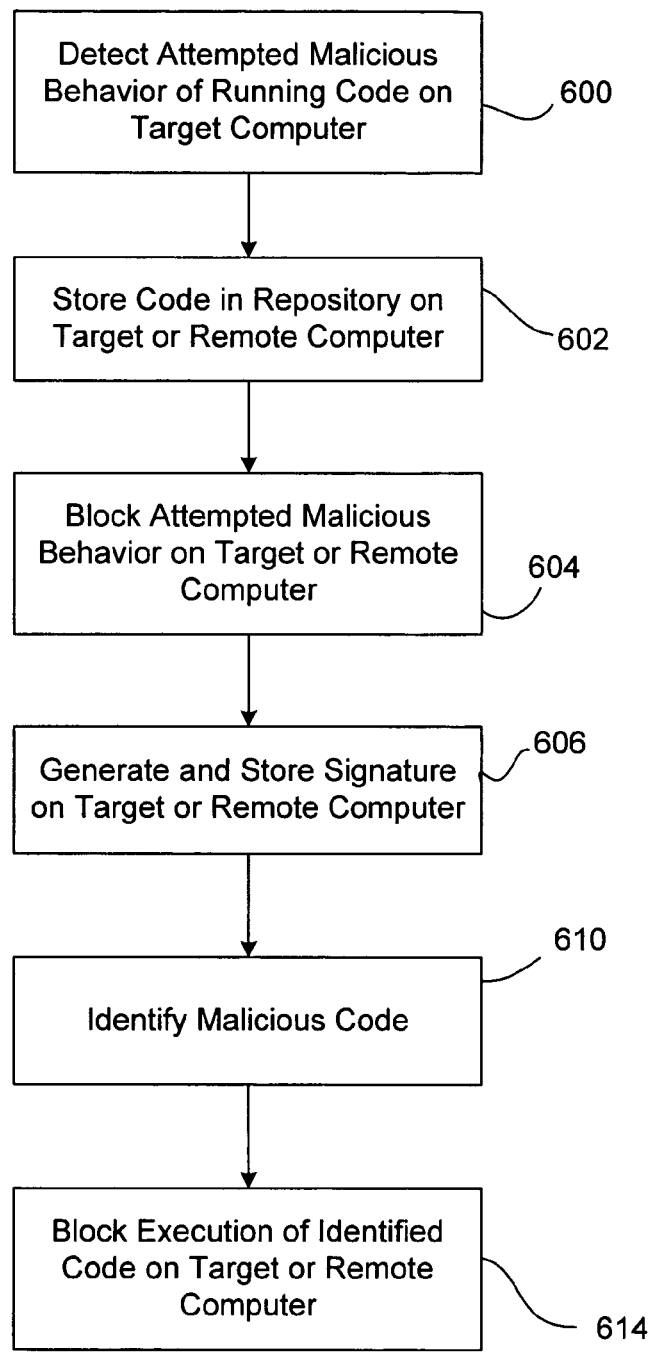
FIG. 6 is a flowchart illustrating steps for detecting and blocking attempted malicious behavior in a network environment, according to some embodiments of the present invention.

Referring now to FIG. 6, the steps for detecting and blocking of attempted malicious behavior in a network-based environment are illustrated. In this embodiment, each of the blocking-scanning manager 101 functionalities can occur either locally or remotely, as explained below. For example, the detecting step might occur on the target computer, while the repository for storing the code may be located on a remote computer and the blocking step may occur remotely.

As shown in FIG. 6, the blocking-scanning manager 101 detects 600 running code 120 that has attempted malicious behavior on a target computer. The target computer can be a computer workstation or another computer that is able to connect to a network. The running code 120 is stored 601 in a repository that can be located either locally on the target computer or remotely on a server or another computer that is able to connect to a network.

The blocking-scanning manager 101 then blocks 604 the attempted malicious behavior, and this blocking step can be initiated either locally on the target computer or remotely on a server or another computer able to connect to a network. As explained in the discussion of FIGS. 1 and 2, a user 140 might or might not be alerted and given a choice regarding how to react to attempted malicious behavior. If the user 140 incorrectly chooses to block a non-malicious program, this might then prevent other users connected to the network from using this blocked program. To minimize this problem, the blocking-scanning manager 101 can be configured to override the user's incorrect choice, as explained in the discussion of FIGS. 1 and 2. As another example, the system 100 might be configured to permit only users at certain target computers to choose whether or not to block a potentially malicious program.

In response to blocking 604 of the attempted malicious behavior, the blocking-scanning manager 101 generates 608 and stores a signature either locally or remotely, as described above. For example, the signature generated 608 could be stored in an antivirus signature database on a remote server. In this example, the signature database would be accessible to the target computer for later use in identification of code that attempted malicious behavior. In another embodiment, the signature database might be accessible to more than one, or possibly all target computers connected to the network. For example, the signature database could be accessible to computers Internet-wide. In this example, these generated 608 signatures might be stored in a database that also stores signatures for known malicious code. In another example, these generated 608 signatures might be stored in a database separate from known malicious code signatures.

In another embodiment, the blocking-scanning manager 101 can be configured to regulate the number of signatures that are generated, as explained in the discussion of FIGS. 1 and 4. For example, polymorphic malicious code might strike numerous systems connected to a network, and it might strike many times, each time causing a different signature to be created. Thus, regulation of the number of signatures generated and/or stored might help prevent an excessive number of signatures passing over a network at once, which might otherwise slow down the network activity.

As explained in the discussion of FIGS. 1 and 4, the signatures generated 608 can also be associated with names that can assist the user in identifying new malicious code, without a known signature. These names can also be updated when known signatures are available, as explained in the discussion of FIGS. 1 and 4.

Referring still to FIG. 6, the blocking-scanning manager 101 identifies 610 malicious code before it executes. This step can be initiated either locally on the target computer or remotely on a server or another computer able to connect to a network. The blocking-scanning manager 101 determines that the code is malicious by comparing the code to the signatures stored and finding a match. In response to finding a match, the blocking-scanning manager 101 blocks 614 execution of the code on a target or remote computer.

Each of the steps explained above in the discussion FIG. 6 can also occur on any combination of a target computer, a remote server, or another remote computer. The blocking-scanning manager 101 functionalities can also extend to individual subnets, entire intranets, or even the larger Internet.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for preventing malicious code from propagating in a computer, the method comprising the steps of:
    a blocking-scanning manager detecting attempted malicious behavior of running code;
    responsive to the detection, the blocking-scanning manager blocking the attempted malicious behavior;
    the blocking-scanning manager generating a signature to identify the code that attempted the malicious behavior;
    the blocking-scanning manager detecting code identified by the signature, wherein detecting code identified by the signature comprises
        the blocking-scanning manager alerting a user of the detection; and
        the blocking-scanning manager allowing the user to choose whether or not to block the execution of the identified code;
    the blocking-scanning manager overriding the user's choice responsive to the user incorrectly choosing to block non-malicious behavior or incorrectly choosing not to block malicious behavior; and
    the blocking-scanning manager blocking the execution of the identified code.

2. The method of claim 1 wherein a source of at least one of the running code and the identified code comprises a source from a group of sources consisting of an e-mail attachment, a magnetic medium, an optical medium, a file, a boot sector, and a network remote computer.

3. The method of claim 1 wherein the blocking-scanning manager detecting code identified by the signature further comprises the blocking-scanning manager comparing the running code to at least one signature generated.

4. The method of claim 3, wherein the blocking-scanning manager comparing the running code to at least one signature generated further comprises the blocking-scanning manager determining that the running code matches at least one of the generated signatures.

5. The method of claim 1 wherein the blocking-scanning manager detecting code identified by the signature further comprises the blocking-scanning manager placing at least one of the running code and the identified code in a repository, such that the user cannot execute the code.

6. The method of claim 1 further comprising:
    the blocking-scanning manager performing the detecting step on a first computer able to connect to a network;
    the blocking-scanning manager placing at least one of the running code and the identified code in a repository located at a location from a group consisting of locally on the first computer, and remotely on a second computer able to connect to the network; and
    the blocking-scanning manager performing the blocking step at a location from a group consisting of locally on the first computer or remotely on a second computer able to connect to the network.

7. The method of claim 1 wherein the blocking-scanning manager blocking the execution of the identified code further comprises the blocking-scanning manager associating a name with the identified code.

8. The method of claim 7 wherein associating a name with the identified code further comprises the blocking-scanning manager changing the name to accord with a new definition of the identified code in a database of known malicious code.

9. The method of claim 1 wherein the blocking-scanning manager generating a signature to identify the code that attempted the malicious behavior further comprises:
    the blocking-scanning manager applying a checksum function to generate a checksum of the code that attempted the malicious behavior;
    the blocking-scanning manager storing the checksum; and
    the blocking-scanning manager using at least one stored checksum to identify code that attempted malicious behavior.

10. A computer implemented method for preventing malicious code from propagating in a computer, the method comprising the steps of:
    a blocking-scanning manager detecting attempted malicious behavior of running code;
    responsive to the detection, the blocking-scanning manager blocking the attempted malicious behavior;
    the blocking-scanning manager generating one or more signatures to identify the code that attempted the malicious behavior;
    the blocking-scanning manager regulating the number of signatures generated within a period of time, wherein regulating the number of signatures comprises:
        the blocking-scanning manager recognizing a predetermined limit on the number of signatures generated within a period of time; and
        responsive to reaching the predetermined limit, the blocking-scanning manager removing older signatures as newer signatures are generated;
    the blocking-scanning manager detecting code identified by a generated signature; and
    the blocking-scanning manager blocking the execution of the identified code.

11. The method of claim 10 wherein regulating the number of signatures further comprises:
    the blocking-scanning manager sorting the signatures according to number of matches per signature to running code that attempted malicious behavior; and
    responsive to reaching the predetermined limit, the blocking-scanning manager removing the signatures with the fewest matches as newer signatures are generated.

12. A computer implemented method for preventing malicious code from propagating in a computer, the method comprising the steps of:
    a blocking-scanning manager detecting attempted malicious behavior of running code;
    responsive to the detection, the blocking-scanning manager blocking the attempted malicious behavior;
    the blocking-scanning manager generating a signature to identify the code that attempted the malicious behavior, wherein generating a signature to identify the code that attempted the malicious behavior comprises:
        the blocking-scanning manager applying a hash function to generate a hash of the code that attempted the malicious behavior;
        the blocking-scanning manager storing the hash; and
        the blocking-scanning manager using at least one stored hash to identify code that attempted malicious behavior;
    the blocking-scanning manager detecting code identified by the signature; and
    the blocking-scanning manager blocking the execution of the identified code.

13. The method of claim 12 wherein the blocking-scanning manager applying a hash function to generate a hash further comprises the blocking-scanning manager generating a hash of at least a portion of a code segment of computer-readable contents associated with the code.

14. The method of claim 12 wherein the blocking-scanning manager applying a hash function to generate a hash further comprises the blocking-scanning manager generating a hash of at least a portion of a data segment of computer-readable contents associated with the code.

15. The method of claim 12 wherein the blocking-scanning manager applying a hash function to generate a hash further comprises the blocking-scanning manager generating a hash of at least a portion of a header of computer-readable contents associated with the code.

16. A computer system for preventing the propagation of malicious code, the computer system comprising:
- a running code detection module, configured to detect attempted malicious behavior of running code;
- a running code blocking module, configured to block the attempted malicious behavior in response to positive detection, the running code blocking module being communicatively coupled to the running code detection module;
- a signature module, configured to generate a signature to identify the code that attempted the malicious behavior, the signature module being communicatively coupled to the running code blocking module;
- an scanning module, configured to detect code identified by the signature, the scanning module being communicatively coupled to the signature module;
- an identified code blocking module, configured to block the execution of the identified code, the identified code blocking module being communicatively coupled to the scanning module; and
- an alert module, configured to alert a user of detection of attempted malicious behavior of code, wherein the alert module is configured to allow a user to choose whether or not to block the execution of the code, the alert module being communicatively coupled to the running code detection module and the scanning module, and wherein the alert module is further configured to override the user's choice responsive to the user incorrectly choosing to block non-malicious behavior or incorrectly choosing not to block malicious behavior.

17. The computer system of claim 16, further comprising a repository, configured to store at least one of the running code and the identified code, such that the user cannot execute the code, the repository being communicatively coupled to the running code detection module and the scanning module.

18. The computer system of claim 16, wherein the scanning module is further configured to compare running code to at least one signature generated, the scanning module being communicatively coupled to the signature module.

19. The computer system of claim 16, further comprising a signature regulation module, configured to regulate the number of signatures generated within a period of time, the signature regulation module being communicatively coupled to the signature module.

20. A computer-readable medium containing a computer program product for preventing the propagation of malicious code in a computer, the computer program product comprising:
- program code for a blocking-scanning manager detecting an attempted malicious behavior of a running code;
- program code for the blocking-scanning manager blocking the attempted malicious behavior in response to the detection;
- program code for the blocking-scanning manager generating a signature to identify the code that attempted the malicious behavior;
- program code for the blocking-scanning manager detecting code identified by the signature;
- program code for the blocking-scanning manager blocking the execution of the identified code;
- program code for a blocking-scanning manager alerting a user of detection of attempted malicious behavior of code;
- program code for a blocking-scanning manager allowing a user to choose whether or not to block the execution of the code; and
- program code for a blocking-scanning manager overriding the user's choice responsive to the user incorrectly choosing to block non-malicious behavior or incorrectly choosing not to block malicious behavior.

21. The computer program product of claim 20, further comprising program code for the blocking-scanning manager comparing the running code to at least one signature generated.

22. The computer program product of claim 20, further comprising program code for the blocking-scanning manager associating a name with the identified code.

* * * * *